United States Patent [19]

Ajami et al.

[11] 4,065,601
[45] Dec. 27, 1977

[54] TWO PHASE ELECTROLYTES USED AS HALOGEN TRAPS IN METAL HALOGEN SECONDARY CELLS AND BATTERIES

[75] Inventors: Alfred M. Ajami, Boston; Fraser M. Walsh, Arlington; Dennis N. Crouse, Melrose, all of Mass.

[73] Assignee: Eco-Control, Inc., Cambridge, Mass.

[21] Appl. No.: 723,142

[22] Filed: Sept. 14, 1976

[51] Int. Cl.$^2$ ............................................. H01M 10/44
[52] U.S. Cl. ..................................... 429/50; 429/105; 429/195; 429/199; 429/222; 429/229
[58] Field of Search ................. 429/50, 101, 105, 222, 429/229–231, 194, 195, 198, 199

[56] References Cited

U.S. PATENT DOCUMENTS

| | | | |
|---|---|---|---|
| 3,408,232 | 10/1968 | Blue et al. | 429/229 X |
| 3,816,177 | 6/1974 | Walsh | 429/222 X |

Primary Examiner—Charles F. LeFevour
Attorney, Agent, or Firm—Kenway & Jenney

[57] ABSTRACT

Organic-aqueous two-phase electrolytes are disclosed in which the organic phase is capable of complexing halogen in cells and batteries of the type which utilize the electrochemical reaction $X_2 \rightleftharpoons 2X^-$, where X is Br, Cl, I or a combination of these halides. The organic phase of the two-phase electrolyte contains an organic halogen salt which provides both conductivity and the ability to complex halogens and prevent them from being dissolved in the aqueous phase of the electrolyte of the cell or battery in which they are used.

14 Claims, 4 Drawing Figures

TWO PHASE ELECTROLYTES USED AS HALOGEN TRAPS IN METAL HALOGEN SECONDARY CELLS AND BATTERIES

BACKGROUND OF THE INVENTION

This invention relates to water insoluble organic electrolytes useful for complexing halogens and more particularly to two-phase electrolytes useful as an electrolyte for electrochemical cells and batteries of the type which utilize a halogen as its electrochemically active agent.

Voltaic cells which include an aqueous solution of zinc or cadmium halide as an electrolyte are known, but are frequently characterized by a relatively high self-discharge rate, low capacity, and high internal resistance. Since elemental halogen is soluble in the aqueous electrolyte, it is difficult to keep metallic zinc or cadmium and elemental halogen apart while simultaneously achieving a system in which a good percentage of the theoretical energy storage capacity can be realized.

Recently, various attempts have been made to prevent elemental halogen from migrating to the zinc or cadmium electrode. For example, U.S. Pat. No. 3,352,720 to G. R. Wilson et al teaches the use of water insoluble polymeric amine halogen complexes in place of the elemental halogen. While the structures disclosed in the Wilson et al patent function as halogen cells, they nevertheless suffer from less than optimum capacities and self-discharge rates because of the low stability of the polyhalogens employed.

Still another improvement in halogen electrochemical cells is disclosed in U.S. patent application Ser. No. 652,780 to Myles A. Walsh, entitled *Halogen Electrode*, filed Jan. 27, 1976. The novel structure disclosed in patent application Ser. No. 652,780 is an electrode which comprises a current collecting matrix which has an extremely stable polymer containing quaternary ammonium, phosphonium, or sulfonium sites incorporated into its structure. Since the polymer is formed in the presence of a high surface area, porous, current collecting matrix, the electrodes are capable of storing halogens in a nonchemically active but highly electrochemically active state in such a manner that uniform, intimate electrical contact is maintained between the halogen-rich sites of the polymer and the current collector, and interaction between halides in the electrolyte and the quaternary sites is greatly facilitated.

U.S. Pat. No. 3,408,232 to R. D. Blue et al teaches the use of organic solvents for extracting bromine from an aqueous electrolyte. While this represents a two-phase approach to halogen storage, the organic phase disclosed therein lacks ionic conductivity; and therefore, the halogen dissolved in the organic phase cannot be discharged at a significant rate and must be back extracted into the aqueous phase before discharge can occur. This means that the aqueous electrolyte of this cell must partially cover both electrodes.

U.S. Pat. No. 3,816,177, to Myles A. Walsh, teaches the use of soluble quaternary ammonium halides and the like which may be dissolved in the electrolyte together with a water soluble depolarizer. When elemental halogen is released into the electrolyte, it combines with the quaternary halide to form a quaternary polyhalide which complexes with the depolarizer to form an insoluble, halogen rich, oil-like complex. If an inert electrode made of a material which absorbs the insoluble complex is employed, an improved cell is provided, since the complex is relatively stable and since the halogen molecules, being concentrated about the current collector, are available for electrochemical reaction to an improved degree.

The instant invention constitutes a further improvement in the halogen cell art and provides a large number of water insoluble organic electrolytes any one of which may be used in conjunction with the aqueous electrolyte of metal halogen cells of the type described. The organic electrolytes of the invention eliminate the necessity of a depolarizer or a specially fabricated electrode, yet provide increased halogen complexing ability, enhancing the shelf-life and capacity of the cells and batteries in which they are used.

SUMMARY OF THE INVENTION

In general, the invention features water insoluble organic electrolytes useful when used in conjunction with the aqueous electrolyte of halogen cells and batteries for complexing halogen. The organic electrolyte has two components, one of which is an organic solvent which is relatively insoluble in water. The second component is an organic salt which is very soluble in the organic solvent, relatively insoluble in an aqueous metal halide solution, forms complexes with halogens which do not crystallize out of the solvent at any point during halogen addition, and which do not react irreversibly with free halogens.

Solvents useful in this invention include but are not limited to solvents such as:

dichloromethane (methylene chloride)
chloroform
carbon tetrachloride
dichloroethane
trichloroethane
tetrachloroethane
pentachloroethane
dibromomethane (methylene bromide)
bromoform or any solvent which does not react with halogens.
Organic salts useful in this invention include:

Ammonium salts:

Pyridinium salts:

Sulfonium salts:

Phosphonium salts:

where all R's may be but need not be equal and R's may be hydrogens, aliphatic radicals, O-alkyl radicals, functionalized aliphatic or O-alkyl radicals, aryl radicals, and/or functionalized aryl radicals. Functionalities on these aliphatic or aryl radicals may include but are not limited to amides, carbocycles, carboxylates, halides, hydroxyls, ethers, esters, nitriles, phosphonates, siloxanes, sulfonates, sulfones, and sultones. Counter ions ($X^-$) associated with these cations may include but are not limited to $F^-$, $Cl^-$, $Br^-$, and $I^-$.

Accordingly, it is an object of this invention to provide a halogen complexing electrolyte, which is insoluble in an aqueous metal halide solution and which is useful in the cells and batteries of the type described which, by complexing elemental halogen, is capable of greatly improving the performance of halogen utilizing electrochemical systems.

Another object of the invention is to provide a large number of electrolytes, any one of which may be used in zinc or cadmium halide cells to complex and hold halogens more efficiently than the aforementioned polymeric amine halogen complexes and the quaternary ammonium polyhalide-depolarizer systems, thereby increasing shelf-life and decreasing self-discharge of the cells and batteries in which the complexing electrolyte is used.

Still another object of the invention is to provide electrolytes which when complexed with halogen comprise water insoluble liquid phases in aqueous metal halide solutions which provide a source of halogen that may be utilized in a halogen cell or battery.

Yet another object of the invention is to provide electrolytes which when complexed with halogen, comprise reasonably conductive liquids allowing the halogens to undergo rapid electrochemical reduction on the electrode of a halogen cell or battery which is in contact with these electrolytes.

Still another object of the invention is to provide electrolytes which when complexed with halogen comprise liquids which can be pumped, stored indefinitely, and thereby used in a regenerative fuel cell or battery and which when complexed with halogen do not structurally alter carbon electrodes or those plastics which uncomplexed elemental halogens quickly degrade.

DESCRIPTION OF THE PREFERRED EMBODIMENT

At the outset, it is desirable to comment on certain terms that are used throughout this specification and claims. For example, the terms "zinc electrode" and "bromide electrode" are not intended to imply that the electrodes are formed from these material exclusively. As is conventional practice, the terms are used merely to indicate the electrochemically active element reacting. The metal and halogen electrodes of the cells with which the electrolytes of the present invention are employed, are electrically conductive, and preferably porous and noncorrosive. Carbon in its various forms is a preferred material. The carbon of the metal electrode serves as a plating surface for zinc or cadmium.

Furthermore, although reference is made to one counter electrode and one metal electrode, it is obvious that the compounds of the invention are useful in cells which include more than one pair of electrodes and with batteries of two or more cells constructed in accordance with methods known to those skilled in the art. Because cadmium is electrochemically similar to zinc, it is also obvious that the zinc of the electrode and the electrolyte can be replaced by cadmium. Although bromine is used throughout this specification and claims, it will be apparent to those skilled in the art that chlorine, iodine, or any combination of bromine, chlorine, and iodine may be substituted therefore.

During discharge of the well-known zinc bromine cell the following half reactions occur:

at the cathode: $Br_2 + 2e \rightarrow 2 Br^-$ at the anode:

On charging, the reactions are reversed:

at the cathode:

at the anode:

The zinc bromide of the electrolyte is hence consumed during charging and produced during discharging. In order for the cell to function properly, $Br_2$, which obviously must be present near the cathode when the cell is undergoing discharge, must somehow be stored. Since $Br_2$ is soluble in water containing dissolved metal halides, precautions must be taken to prevent it from migrating through the aqueous electrolyte and reacting directly with the metallic zinc at the anode. This goal has been reached by incorporating a porous, conducting, preferably carbon matrix of the type disclosed in U.S. Pat. No. 3,816,177 to M. A. Walsh, entitled *Secondary Cells and Batteries*, the disclosure of which is incorporated herein by reference, and one of the electrolytes of the invention, into a halogen cell.

Figure 1:
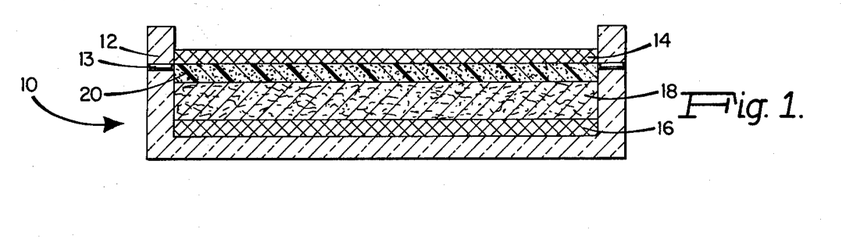
FIG. 1 is a cross-sectional view of a cell of the type in which the complexing electrolytes of the present invention are useful.

At this point it should be noted that the organic phase of the two-phase electrolyte need not be denser than the aqueous phae of the two-phase electrolyte. If the organic phae is denser than the aqueous phase then its use is best illustrated in FIG. 1 where the bromide electrode 16 is shown positioned in the bottom of the cell and is covered by the organic phase of the two-phase electrolyte. By locating the bromide electrode at the bottom of the cell and by utilizing an organic solvent in the two-phase electrolyte which is heavier or denser than the aqueous phase, the organic phase of the two-phase electrolyte is absorbed into the porous electrode 16 and halogen produced during charging is complexed by the organic salt dissolved in the organic phase and is prevented from solubilizing in the aqueous phase of the electrolyte.

The use of halogenated solvents to store bromine in secondary cells was reported by Little, U.S. Pat. No. 870,973 (1907). The use of solid quaternary ammonium perhalogen salts to store bromine in a secondary cell was reported by Bloch, U.S. Pat. No. 2,566,114 (1951). Both of these methods suffer from a slowed rate of cell discharge due to a lack of conductivity in the halogenated phase. This problem was solved by the use of a water soluble organic solvent in U.S. Pat. No. 3,816,177 to Myles A. Walsh. The solvent was shown to keep the halogen complex liquid and thereby conductive. The instant invention discloses the use of a water insoluble organic solvent to accomplish the same purpose with an added organic salt to complex the halogen and increase the conductivity of th insoluble organic solvent in the electrolyte. The organic phase of the two-phase electrolyte of this invention forms a multi-component layer which separates from the aqueous metal halide solutions which comprise the aqueous phase.

As is stated above, one of the components of halogen complexing organic phase of the two-phase electrolyte is an organic solvent which is relatively insoluble in water. The solvents useful as a component in the organic phase include but are not limited to:

dichloromethane (methylene chloride)
chloroform
carbon tetrachloride
dichloroethane
trichloroethane
tetrachloroethane
pentachloroethane
dibromomethane (methylene bromide)
bromoform or any water immiscible solvent which does not react with bromine.

The second component of the halogen complexing organic phase of the two-phase electrolyte is an organic salt which is very soluble in the organic solvent, relatively insoluble in an aqueous metal halide solution, forms complexes with halogens which do not crystallize out of the solvent at any point during halogen addition, and which do not react irreversibly with free halogens.

Organic salts useful in this invention include:

Ammonium salts:

Pyridinium salts:

Sulfonium salts:

Phosphonium salts:

where all R's may be but need not be equal and R's may be hydrogens, aliphatic radicals, O-alkyl radicals, functionalized aliphatic or O-alkyl radials, aryl radicals, and/or functionalized aryl radicals. Functionalities on these aliphatic or aryl radicals may include but are not limited to amides, carbocycles, carboxylates, halides, hydroxyls, ethers, esters, nitriles, phosphonates, siloxanes, sulfonates, sulfones, and sultones. Counter ions ($X^-$) associated with these cations may include but are not limited to $F^-$, $Cl^-$, $Br^-$, and $I^-$.

The synthesis of these cations involves the addition of an alkyl halide to the divalent (S) or trivalent (N or P) base which is in the pure form or diluted in any one of a number of common solvents.

EXAMPLE A

In a 250 ml round-bottomed flask, tri-n-propylamine (14.3 g) in 1:9 methanol-nitromethane (75 ml) was treated with ethyl bromide (16 g), added in one portion, and warmed at 65° for 36 hours below a water cooled condensor. The methanolnitromethane mixture was removed at reduced pressure and the residue slurried with 1:9 acetone-hexane to complete crystallization. After refrigeration for 2 hours at 0°-4°, the crystalline product was filtered and desiccated yielding 23.5 g (94%) of coarse white needles, m.p. 290°-291° d., according to the reaction:

EXAMPLE B

In a 250 ml round-bottomed flask, triethylamine (10.5 g) in 50 ml nitromethane was treated with 1-bromobutane, added in one portion and left stoppered at room temperature for 72 hours. Removal of the nitromethane under reduced pressure afforded a solid residue which was recrystallized from acetone-hexane yielding 19.5 g (92%) of white crystalline quaternary salt, m.p. 208°-211° d., according to the reaction:

The amount of halogen complexing agent (salt) dissolved in the organic solvent phase is important both for conductivity and the bromine partion coefficient with the aqueous electrolyte phase. Solubilities of a number of quaternary ammonium bromides in methylene chloride are given in Table 1 below.

Table 1

Solubilities: Quaternary Ammonium Bromides (5 mM) in Methylene Chloride at 25° C

| HCB* | Quaternary Cation (5 mM) | g of MeCl$_2$ Anion Br$^\ominus$ | g of MeCL$_2$ Anion Br$_3^\ominus$ |
|---|---|---|---|
| 14 | Pr$_3$PentN$^\oplus$ | 0.939 | ≦ 0.939 |
| 24 | Hex$_4$N$^\oplus$ | 0.962 | ≦ 0.962 |

Table 1-continued

Solubilities: Quaternary Ammonium Bromides (5 mM) in Methylene Chloride at 25° C

| HCB* | Quaternary Cation (5 mM) | g of MeCl$_2$ Anion Br$^\ominus$ | g of MeCL$_2$ Anion Br$_3^\ominus$ |
|---|---|---|---|
| 16 | Bu$_4$N$^\oplus$ | 1.000 | 2.325 |
| 7 | Et$_3$MeN$^\oplus$ | 1.036 | ≦ 1.036 |
| 8 | Et$_2$MePrN$^\oplus$ | 1.167 | ≦ 1.167 |
| 13 | BuPr$_3$N$^\oplus$ | 1.275 | ≦ 1.275 |
| 14 | Bu$_3$EtN$^\oplus$ | 1.351 | ≦ 1.351 |
| 20 | Pent$_4$N$^\oplus$ | 1.600 | ≦ 1.600 |
| 11 | EtPr$_3$N$^\oplus$ | 1.600 | ≦ 1.600 |
| 10 | BuEt$_3$N$^\oplus$ | 1.600 | ≦ 1.600 |
| 9 | Et$_3$PrN$^\oplus$ | 1.600 | ≦ 1.600 |
| 28 | Hept$_4$N$^\oplus$ | 1.600 | ≦ 1.600 |
| 12 | Pr$_4$N$^\oplus$ | 2.197 | — |
| 15 | Ch$_2$EtMeN$^\oplus$ | 2.423 | — |
| 6 | Et$_3$Me$_2$N$^\oplus$ | 5.388 | — |
| 8 | Et$_3$N$^\oplus$ | 12.863 | — |
| 7 | EtMe$_2$iPrN$^\oplus$ | 17.542 | — |

Figure 2:
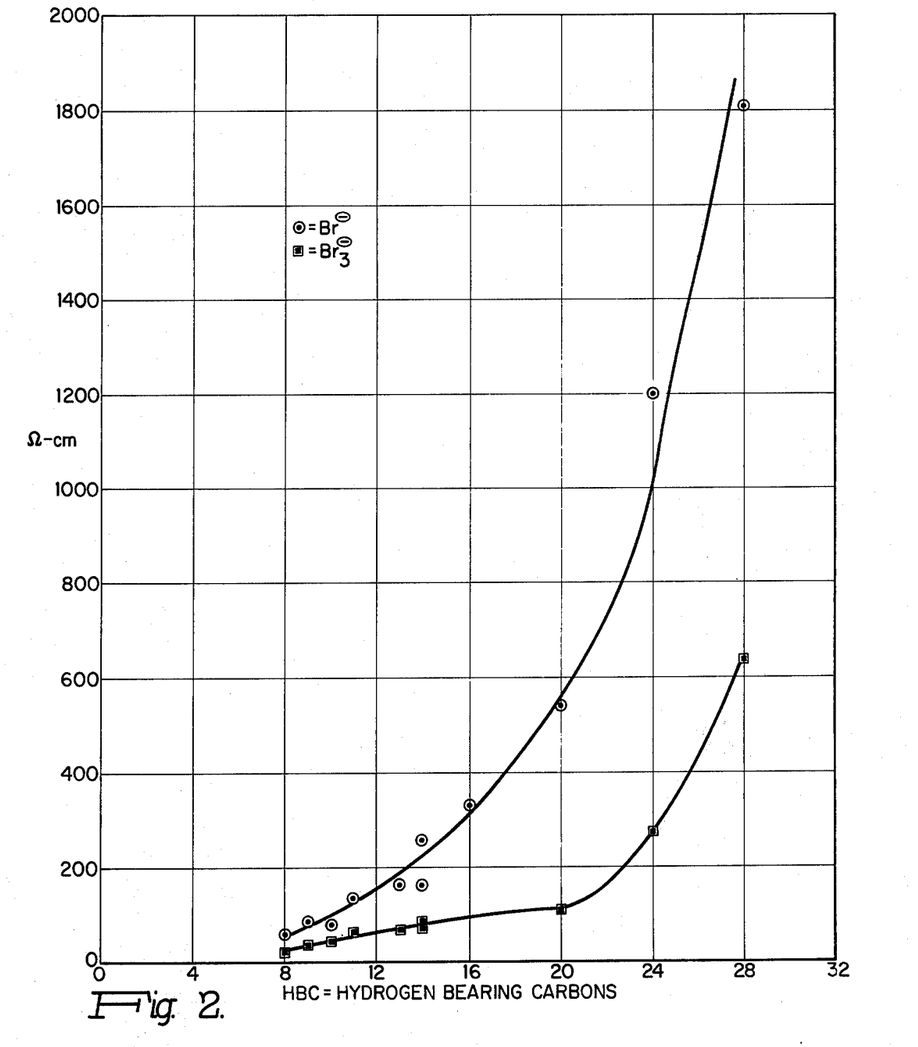
FIG. 2 is a graph which illustrates ionic conductivities.

*HCB is hydrogen bearing carbons in the cation.
Bu is butyl  Me is methyl
Ch is cyclohexyl  Pent is pentyl
Et is ethyl  iPr is iso-propyl
Hept is heptyl  Pr is propyl
Hex is hexyl Since the liquidity of the organic phase must be maintained, the ammonium polyhalides must be soluble in this phase. The only cation disclosed in which the polybromide is less soluble than the bromide is tetrabutyl ammonium cation. Ionic conductivities given in Table 2 and plotted in FIG. 2 show that as theory dictates the smaller the cation the higher the conductivity.

Table 2

Conductivities+: 5 mM Quaternary Ammonium in 1.60 g MeCl$_2$

| HCB* | Quaternary Cation | ConductivityΩ-cm Anion Br$^\ominus$ | ConductivityΩ-cm Anion Br$_3^\ominus$ |
|---|---|---|---|
| 28 | Hept$_4$N$^\oplus$ | 1600 | 635 |
| 24 | Hex$_4$N$^\oplus$ | 1000 | 277 |
| 20 | Pent$_4$N$^\oplus$ | 535 | 107 |
| 16 | Bu$_4$N$^\oplus$ | 325 | crystalline |
| 14 | Bu$_3$EtN$^\oplus$ | 255 | 88 |
| 14 | Pr$_3$PentN$^\oplus$ | 165 | 73 |
| 13 | BuPr$_3$N$^\oplus$ | 162 | 63 |
| 11 | EtPr$_3$N$^\oplus$ | 131 | 69 |
| 10 | BuEt$_3$N$^\oplus$ | 83 | 43 |
| 9 | Et$_3$PrN$^\oplus$ | 86 | 33 |
| 8 | Et$_2$MePrN$^\oplus$ | 60 | 25 |
| 7 | Et$_3$MeN$^\oplus$ | 46 | 20 |

*HCB is hydrogen bearing carbons in the cation.
Bu is butyl  Me is methyl
Et is ethyl  Pent is pentyl
Help is heptyl  Pr is propyl
Hex is hexyl +Conductivities were evaluated at 1 KC at 25° C between the points of two conical carbon electrodes and standardized with respect to a 1N KOH solution.

The increased ionic conductivity of polybromide anions is probably due to transfer diffusion (I. Ruff and V. J. Friedrich, *J. Phys. Chem.*, 76, 2957 (1972)). Partition of the bromine between the two electrolyte phases has been evaluated titrimetrically and is given in Table 3 below.

Table 3

| Quaternary Ammonium Bromide (3.28 mM) | Solvent (0.795 ml) | % Br in Organic Phase |
|---|---|---|
| None | CH$_2$Cl$_2$ | 33.2 |
| [EtPr$_3$N]$^+$Br | CH$_2$Cl$_2$ | 91.4 |
| [EtPr$_3$N]$^+$Br$^-$ | CH$_2$Br$_2$ | 92.2 |

Table 3-continued

| Quaternary Ammonium Bromide (3.28 mM) | Solvent (0.795 ml) | % Br in Organic Phase |
|---|---|---|
| [Et$_2$NCH$_2$CH$_2$OCH$_2$CH$_3$]$^+$Br$^-$ | CH$_2$Cl$_2$ | 90.9 |
| [BuEt$_2$NCH$_2$CH$_2$OH]$^+$Br$^-$ | CH$_2$Cl$_2$ | 87.7 |

Bromine used was 0.504 ml per test corresponding to Br$_7{}^-$. Aqueous zinc bromide (5 ml, 2M) per test was used. Each test was stirred vigorously for 45 minutes at 25° before an aliquot was titrated for bromine.

Referring to FIG. 1, a cell 10 is shown which utilizes the two-phase electrolyte of the present invention in which the organic phase is denser than the aqueous electrolyte and which comprises a case 12, a pair of graphite electrodes 14, 16, a graphite-felt mass 18, and a porous polymeric separator 20. Graphite electrode 16 acts as the bromine electrode; electrode 14 acts as the zinc electrode. Electric leads (not shown) are connected to the electrode 14 by means of clips. A lead is also connected through case 12 to electrode 16. The area of case 12 around the lead is sealed to prevent leakage. Electrodes 14, 16 have a porosity of 26%. Suitable graphite felt is available commercially from Union Carbide Corporation (VWF grade), and a suitable separator may be purchased from W. R. Grace, Inc. under the tradename DARAMIC. The electrolyte of the cell comprises inorganic salts, such as zinc halide, or halide, or cadmium halide, and may include 0 to 30% of one or more of various additives for improved metal plating. The cell case 12 is fitted with non-wetting porous plugs 13 for venting any hydrogen gas formed on the zinc electrode 14. The heavier organic phase is held by gravity in the graphite felt mass 18 during charge and discharge of the cell. The lighter aqueous phase is held by gravity against the zinc electrode 14 during charge and discharge of the cell.

Figure 3:
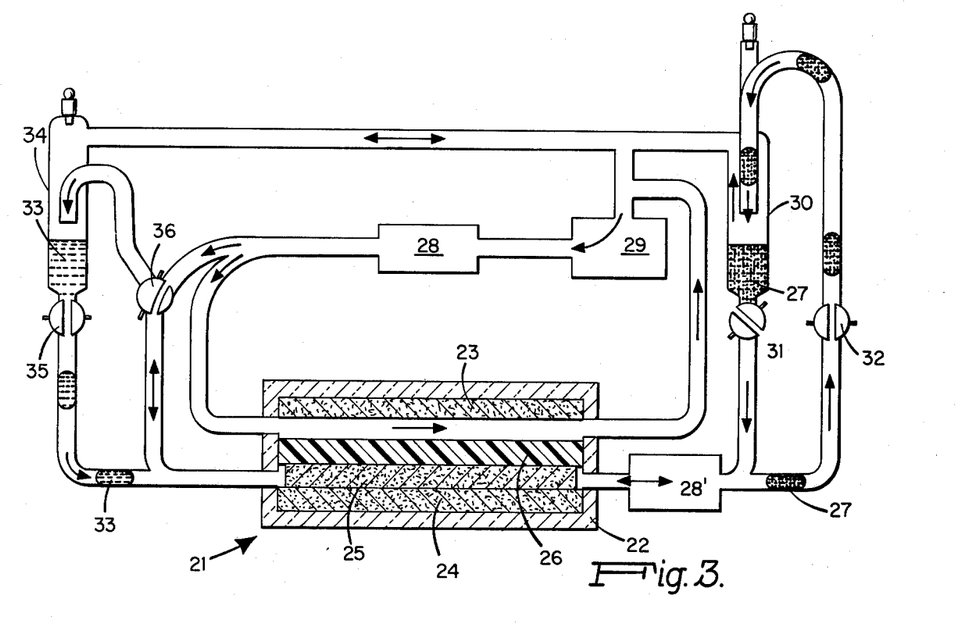
FIG. 3 is a schematic of a regenerative fuel cell in which a recirculating electrolyte of the present invention is useful; and, FIG. 4 is a cross-sectional view of a battery of the type in which the complexing electrolytes of the present invention are useful.

Referring to FIG. 3, a cell 21 is shown with a recirculating two-phase electrolyte as described herein. The cell 21 comprises a case 22, a pair of graphite electrodes 23, 24, a graphite felt mass 25, and a porous polymeric separator 26. The equipment for storing the halogen complex phase 27, and providing fresh electrolyte comprises pumps 28, 28', and electrolyte reservoir 29, a halogen complex phase reservoir 30, and a pair of valves 31 and 32 for storing and releasing the halogen complex phase 27. During charge, the halogen complex phase 27 is formed in the felt 25 from the organic phase of the electrolyte 33 of the present invention. The resulting halogen complex phase 27 is pumped to reservoir 30 where it can be pumped back into felt 25 for discharge or from which it can supply the halogen at a controlled rate into the electrolyte. The metal is plated out on electrode 23 during charge with the quality of the plate dependent on flow rate. The organic phase of the electrolyte 33 is held in a storage reservoir 34 with a pair of valves 35 and 36 for storing and releasing organic electrolyte 33. The aqueous electrolyte of the cell comprises inorganic salts such as zinc halide or cadmium halide, and may include 0 to 30% of one or more of various additives for improved plating.

Those skilled in the art will appreciate that complex 27 may be used to drive cells other than the one illustrated in FIG. 3. For example, in addition to zinc and cadmium cells, the complexes will be useful in other halogen utilizing cells which may employ, for example, titanium, iron, chromium, hydrogen or organic redox couples as an anode.

To demonstrate the effect of the compounds of the invention, a cell with a recirculating two-phase electrolyte as described above containing ECO-1 was charged at current densities ranging typically from 10 to 60 amperes per square foot for periods of time ranging from 1 to 3 hr. The cell was tested at a constant current drain for a variety of current densities and was demonstrated to have a coulombic efficiency of 50 to 80% and an energy efficiency of 40 to 60%. Without a two phase electrolyte of the present invention no halogen complex 27 is formed and the bromine, which dissolves in the electrolyte, reacts with the zinc plate on electrode 23 resulting in a coulombic and energy efficiency of less than 5%.

Figure 4:
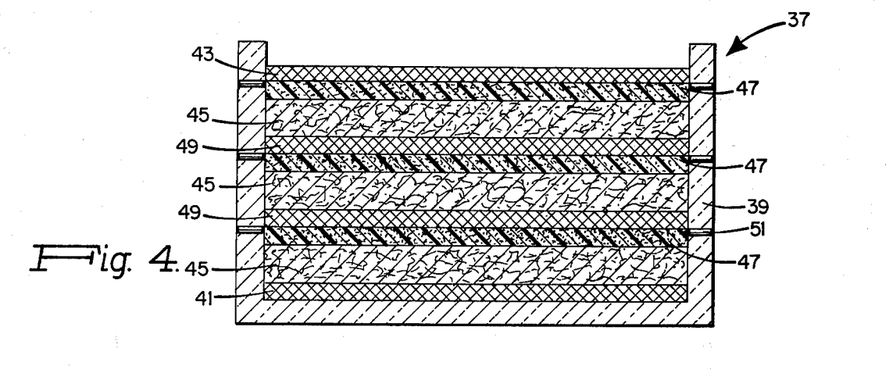

FIG. 4 depicts a bipolar, multi-celled battery 37 of the type which utilizes the two phase electrolyte of the invention. It comprises a glass water-tight case 39 which encloses a pair of graphite plate current collectors 41, 43, to which electrical leads (not shown) are connected. Plate 43 serves as a metal electrode. Plate 41 serves as a halide electrode. Interposed between the current collectors 41, 43 is an array of graphite felt masses 45 which serves as counter electrodes in conjunction with a bipolar electrode which is formed by a porous polymeric separator 47 (Daramic, approximately 0.125 in. thick) and a bipolar electrode 49 (conductive polymer film made by Conductive Polymer Corporation, Marblehead, Massachusetts, approximately 0.020 in. thick. As is shown, separator 47 and bipolar electrode 49 are interposed between each graphite felt mass 45. The cell case 39 is fitted with non-wetting porous plugs 51 for venting any hydrogen gas formed on the zinc electrodes 43 and 49. The number of cells in the battery, of course, may be increased or decreased as desired.

For the case in which the organic phase is denser than the aqueous phase the heavier organic phase is held by gravity in the graphite felt masses 45 during charge and discharge of the cell. The lighter aqueous phase is held by gravity against the zinc electrodes 43 and 49 during charge and discharge of the cell. As is apparent, the faces of the bipolar electrodes facing metal electrode 43 serve as halide electrodes while the face facing the halide electrode 41 serves as metal electrodes.

Those skilled in the art will appreciate that organic phases less dense than the electrolyte can be used by inverting the cells described. When cells with recirculating electrolytes are used with electrodes in a vertical configuration, the density of the organic phase is not important; in such cells the organic phase is allowed to flow through the porous graphite-felt mass 18.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A method for improving the performance of current delivering electrochemical systems of the type which utilize a halogen selected from the group consisting of bromine, chlorine, iodine, and mixtures thereof as an electrochemically active agent which reacts electrochemically at a halide electrode and which system includes a metal electrode and an aqueous metal halide electrolyte phase in which halogens are soluble, wherein the improvement comprises using an organic halogen complexing phase which has two components, one of which is an organic solvent which is insoluble in water, the second component being an organic salt which is soluble in the organic solvent, forms complexes with halogens which do not crystallize out of the solvent at any point during halogen addition, and which do not react irreversibly with free halogens, the organic halogen complexing phase remaining insoluble with the aqueous electrolyte phase during charging and discharging of the current delivery system, the organic salt of the halogen complexing phase forming a reversible complex with the halogen to store halogen during charging of the system and to release halogen during discharging of the system, the halogen complexing phase preventing halogens from dissolving in the aqueous phase.

2. The method as set forth in claim 1 wherein said organic solvent is a solvent selected from the group consisting of dichloromethane, chloroform, carbon tetrachloride, dichloroethane, trichloroethane, tetrachloroethane, pentachloroethane, dibromomethane and bromoform.

3. The method as set forth in claim 2 wherein said organic salt is a salt selected from the group consisting of:

Ammonium salts having the formula:

Pyridinium salts having the formula:

Sulfonium salts having the formula:

Phosphonium salts having the formula:

where all R's may be but need not be equal and R's may be hydrogens, aliphatic radicals, O-alkyl radicals, functionalized aliphatic or O-alkyl radicals, aryl radicals, and/or functionalized aryl radicals.

4. The method as set forth in claim 2 wherein said organic salt is a salt selected from the group consisting of pentyl-tripropyl ammonium bromide, methyl-triethyl ammonium bromide, diethyl-methyl-propyl ammonium bromide, butyl-tripropyl ammonium bromide, ethyl-tributyl ammonium bromide, tetropentyl ammonium bromide, ethyl-tripropyl ammonium bromide, butyl-triethyl ammonium bromide, propyl-triethyl ammonium bromide.

5. The method as set forth in claim 3 wherein X$^-$ is an ion selected from the group consisting of F$^-$, Cl$^-$, Br$^-$, and I$^-$, and wherein functionalities on aliphatic and aryl radicals are selected from the group consisting of amides, carbocycles, carboxylates, halides, hydroxyls, ethers, esters, nitriles, phosphonates, siloxanes, sulfonates, sulfones, and sultones.

6. The method as set forth in claim 1 wherein said organic salt is a salt selected from the group consisting of:

Ammonium salts having the formula:

Pyridinium salts having the formula:

Sulfonium salts having the formula:

Phosphonium salts having the formula:

where all R's may be but need not be equal and R's may be hydrogens, alphatic radicals, O-alkyl radicals, functionalized aliphatic or O-alkyl radicals, aryl radicals and/or functionalized aryl radicals.

7. The method as set forth in claim 6 wherein X⁻ is an ion selected from the group consisting of F⁻, Cl⁻, Br⁻, and I⁻, and wherein functionalities on aliphatic and aryl radicals are selected from the group consisting of amides, carbocycles, carboxylates, halides, hydroxyls, ethers, esters, nitriles, phosphonates, siloxanes, sulfonates, sulfones, and sultones.

8. An electrochemical cell comprising a case, a porous, conductive halide electrode, a Me electrode where Me is selected from the group consisting of zinc and cadmium, an aqueous electrolyte in which halogens are soluble containing an inorganic salt of the formula MX, where M is selected from the group consisting of cadmium and zinc, and X is selected from the group consisting of bromide, chloride, iodide and combinations thereof, and an organic halogen complexing phase, said organic phase having two components, one of which is an organic solvent which is insoluble in water, the second component being an organic salt which is soluble in the organic solvent, forms complexes with halogens which do not crystallize out of the solvent at any point during halogen addition, and which do not react irreversibly with free halogens, the organic halogen complexing phase remaining insoluble with the aqueous electrolyte during charging and discharging of the current delivery system, the organic salt of the halogen complexing phase forming a reversible complex with the halogen to store halogen during charging of the system and to release halogen during discharging of the system, the halogen complexing phase preventing halogens from dissolving in the aqueous electrolyte.

9. The cell as set forth in claim 8 wherein said organic solvent is a solvent selected from the group consisting of dichloromethane, chloroform, carbon tetrachloride, dichloroethane, trichloroethane, tetrachlorethane, pentachloroethane, dibromomethane and bromoform.

10. The cell as set forth in claim 9 wherein said organic salt is a salt selected from the group consisting of:

Ammonium salts having the formula:

Pyridinium salts having the formula:

Sulfonium salts having the formula:

Phosphonium salts having the formula:

where all R's may be but need not be equal and R's may be hydrogens, aliphatic radicals, O-alkyl radicals, functionalized aliphatic or O-alkyl radicals, aryl radicals and/or functionalized ary radicals.

11. The cell as set forth in claim 9 wherein said salt is selected from the group of pentyl-tripropyl ammonium bromide, methyl-triethyl ammonium bromide, diethyl-methyl-propyl ammonium bromide, butyl-tripropyl ammonium bromide, ethyl-tributyl ammonium bromide, tetrapentyl ammonium bromide, ethyl-tripropyl ammonium bromide, butyl-triethyl ammonium bromide, propyl-triethyl ammonium bromide.

12. The cell as set forth in claim 10 wherein X⁻ is an ion selected from the group consisting of F⁻, Cl⁻, Br⁻, and I⁻, and wherein functionalities on aliphatic and aryl radicals are selected from the group consisting of amides, carbocycles, carboxylates, halides, hydroxyls, ethers, esters, nitriles, phosphonates, siloxanes, sulfonates, sulfones, and sultones.

13. The cell as set forth in claim 8 wherein said organic salt is a salt selected from the group consisting of:

Ammonium salts having the formula:

-continued

Pyridinium salts having the formula:

Sulfonium salts having the formula:

Phosphonium salts having the formula:

where all R's may be but need not be equal and R's may be hydrogens, aliphatic radicals, O-alkyl radicals, functionalized aliphatic or O-alkyl radicals, aryl radicals, and/or functionalized aryl radicals.

14. The cell as set forth in claim 13 wherein $X^-$ is an ion selected from the group consisting of $F^-$, $Cl^-$, $Br^-$, and $I^-$, and wherein functionalities on aliphatic and aryl radicals are selected from the group consisting of amides, carbocycles, carboxylates, halides, hydroxyls, ethers, esters, nitriles, phosphonates, siloxanes, sulfonates, sulfones, and sultones.

* * * * *

UNITED STATES PATENT OFFICE
CERTIFICATE OF CORRECTION

Patent No. 4,065,601      Dated December 27, 1977

Inventor(s) Alfred M. Ajami et al.

It is certified that error appears in the above-identified patent and that said Letters Patent are hereby corrected as shown below:

Column 3, line 16, change the left-hand portion of the formula to read:

Column 4, line 43, change "material" to --materials--

Column 5, line 26, change "phae" to --phase--

Column 5, line 27, change "phae" to --phase--

Column 6, line 11, change "th" to --the--

Column 6, line 49, change the right-hand portion of the formula to read:

Column 7, line 11, change "radials" to --radicals--

Column 11, line 50, change the right-hand portion of the formula to read:

UNITED STATES PATENT OFFICE

CERTIFICATE OF CORRECTION

Patent No. 4,065,601  Dated December 27, 1977

Inventor(s) Alfred M. Ajami et al.

It is certified that error appears in the above-identified patent and that said Letters Patent are hereby corrected as shown below:

Column 14, line 35, the right-hand portion of the formula should read:

Column 15, line 18, the right-hand portion of the formula should read:

Signed and Sealed this

Thirteenth Day of June 1978

[SEAL]

Attest:

RUTH C. MASON
Attesting Officer

DONALD W. BANNER
Commissioner of Patents and Trademarks